Figure 1:
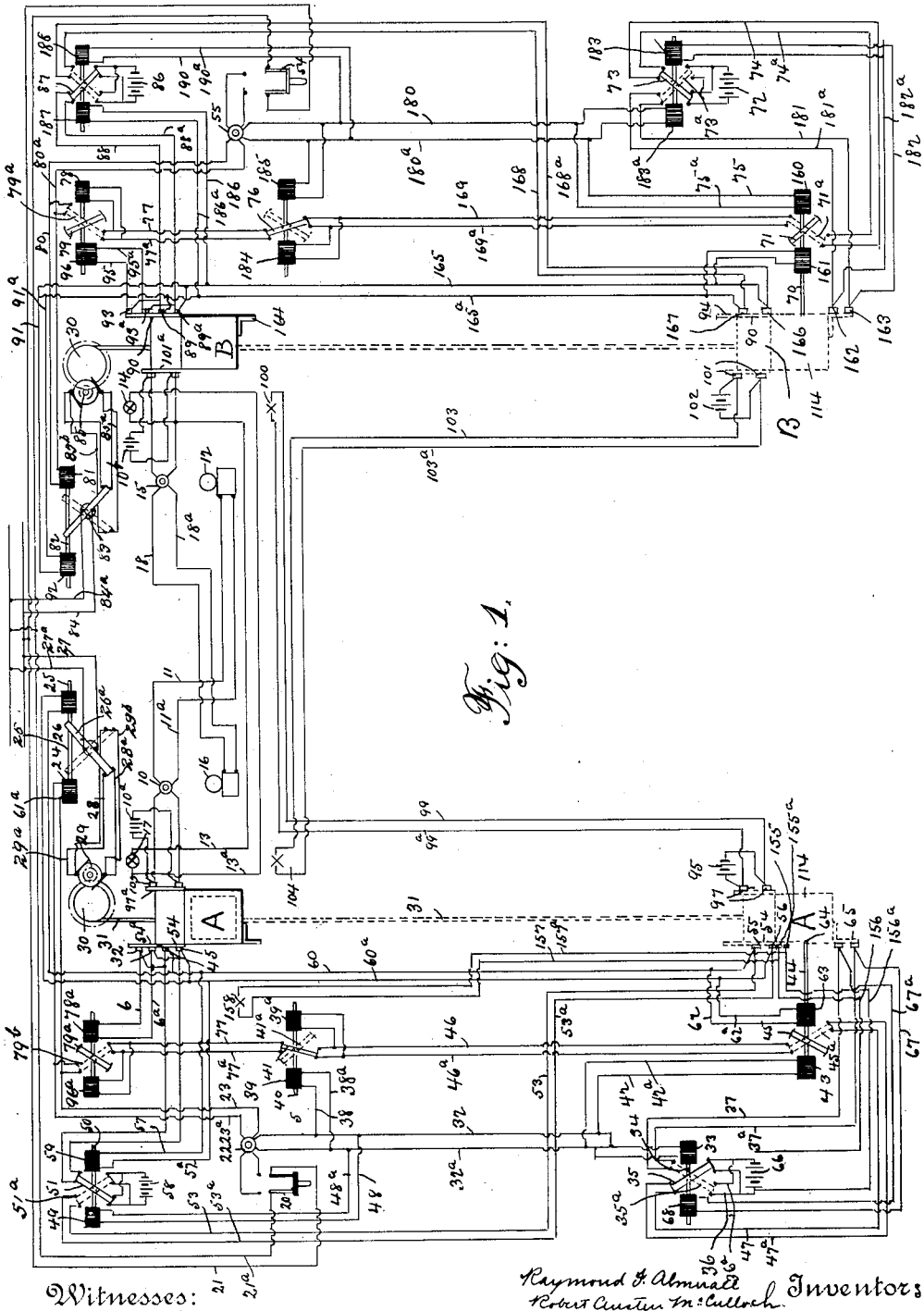

R. F. ALMIRALL & R. A. McCULLOCH.
FOOD CONVEYING SYSTEM.
APPLICATION FILED NOV. 3, 1911.

1,095,692.

Patented May 5, 1914.
3 SHEETS—SHEET 1.

Witnesses:
Arthur H. Dannell
M. J. O'Donnell

Raymond F. Almirall
Robert Austin McCulloch
Inventors

By their Attorney
W. D. Hutchinson.

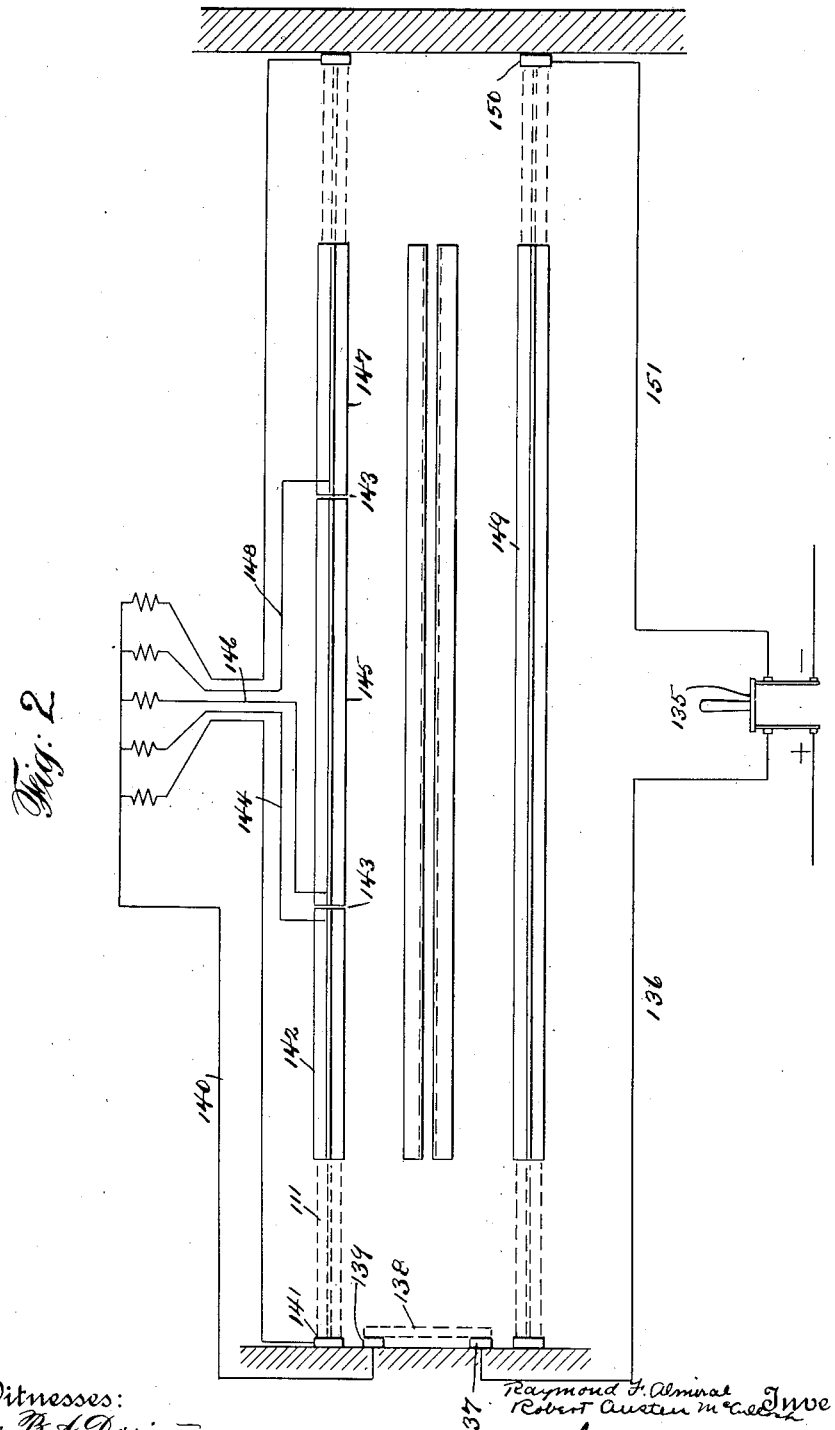

R. F. ALMIRALL & R. A. McCULLOCH.
FOOD CONVEYING SYSTEM.
APPLICATION FILED NOV. 3, 1911.
1,095,692.
Patented May 5, 1914.
3 SHEETS—SHEET 3.
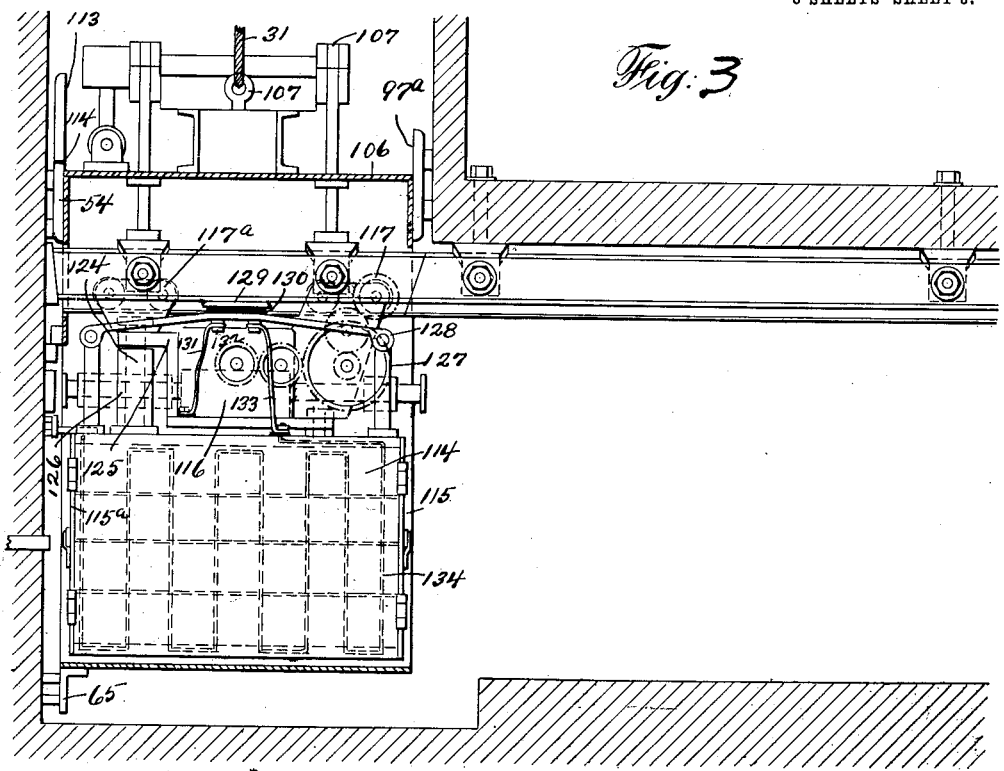
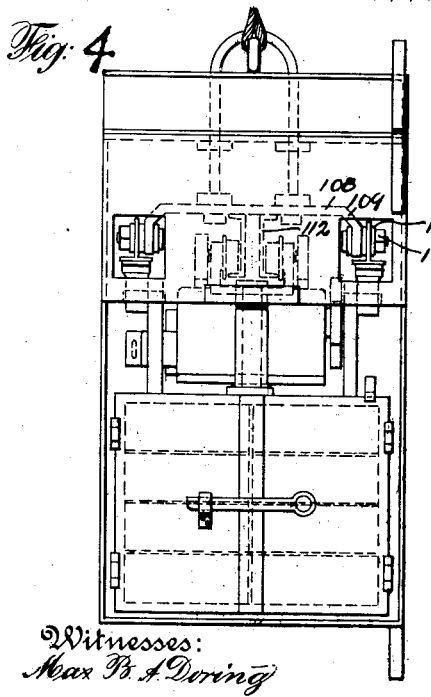
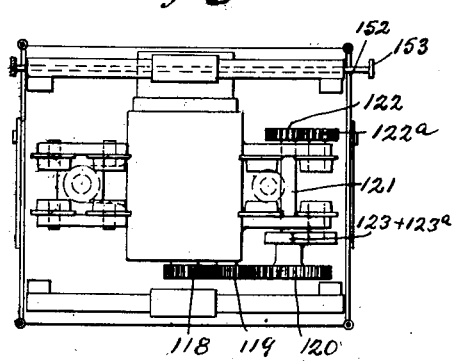

UNITED STATES PATENT OFFICE.

RAYMOND F. ALMIRALL AND ROBERT AUSTEN McCULLOCH, OF NEW YORK, N. Y.

FOOD-CONVEYING SYSTEM.

1,095,692.      Specification of Letters Patent.      Patented May 5, 1914.

Application filed November 3, 1911. Serial No. 658,394.

*To all whom it may concern:*

Be it known that we, RAYMOND F. ALMIRALL, of New York, Kings county, New York, and ROBERT AUSTEN McCULLOCH, of the city, county, and State of New York, have invented a new and useful Improvement in Food-Conveying Systems, of which the following is a full, clear, and exact description.

Our invention relates to improvements in food conveying systems such as are used when the kitchen or place where food is prepared is at a considerable distance from the dining room or other place where it is desired to have the food delivered. In hospitals, for example, it frequently happens that the kitchen is in a separate building or far removed from the dining room, and it is necessary to have the food when prepared, delivered quickly from one place to another.

The object of our invention is to provide means by which food may be transported quickly and automatically from one building or place to another. To this end we provide a food conveying system which includes a food car which can be lowered from the kitchen in an elevator, and which will leave the elevator at the desired point and is then pushed along a track and delivered into another elevator, and is then raised to the place where the food is wanted, together with an electric system whereby all the movements of the car after it has started are uninterrupted and automatic, and also whereby the food is kept hot in the car while in transit.

Reference is to be had to the accompanying drawings forming a part of this specification, in which similar reference characters indicate corresponding parts in all the views.

Figure 1 is a general diagram of the electric circuits and switches embodied in my invention. Fig. 2 is a top view of the tracks and diagram of the electric circuits connected with the tracks. Fig. 3 is a sectional side elevation of the elevator in the basement, and the track connections. Fig. 4 is a front view of the elevator and food car, and Fig. 5 is a top view of the food car.

In the drawings I have indicated the kitchen as located at the left and the dining room at the right in the figures.

Assuming that the operator in the kitchen desires to despatch the food car to the dining room, it is necessary that the food car shall be lowered into the basement and conveyed horizontally a distance until it comes into the building or a portion of the same building where the dining room is located, and then the food car raised in another elevator to the dining room itself. When the operator desires to despatch food from the kitchen to the dining room in this way, he first presses the button 10 which by means of the battery $10^a$ and the wires 11 and $11^a$ rings the bell 12 in the dining room. In this way he signals to the operator in the dining room that he is about to despatch food and notifies him to lower the elevator from the dining room. At the same time, the operator in the dining room to signal to the kitchen that he is ready to receive the food car, presses the button 15 which rings the bell 16 in the kitchen by means of the wires $18$—$18^a$ and battery $10^b$. When the operator in the kitchen has thus received the signal from the dining room that the operator in the dining room is ready to despatch his elevator, he closes the switch 20 which connects the system with the leading-in wires 21 and $21^a$. This current is presumably of high voltage to operate the motor hereinafter referred to. The operator then presses a button 22 which closes the electric circuit through the wires 23 and $23^a$, which will energize the coil 24 and thereby move the bar 25 into the position shown in Fig. 2. The bar 25 by means of the pin 26 moves the slotted arm $26^a$ into the position shown by dotted lines in Fig. 1, and allows the current to flow from the intake wires 27 and $27^a$ through the wires 28 and $28^a$ into the motor 29. The motor 29 is connected so as to turn the pulley 30 to lower the elevator A, which is supported by the cable 31. It will be understood that the switch controlled by the arm $26^a$ can be any standard type of solenoid operated reversing switch such as Sprague switches handled by Otis Elevator Company, or the Cutler-Hammer Manufacturing Company.

When the operator pushes the button 22, the circuit is also closed through the wires 32 and $32^a$, which energizes the coil 33 and moves the bar 34 and the switch $35^a$ into position so as to close the circuit between the wires $36$—$36^a$ and $37$—$37^a$. At the same operation of pushing the button 22, the circuit is closed through the wires 38 and $38^a$ which energizes the coil 39 and moves the bar 40 and switch into the position as shown at $41^a$. At the same time when the button 22 is pressed, a circuit is also closed through the wires 42 and $42^a$ which energizes the coil 43 and moves the bar 44 and throws the switch arm $45^a$ so as to close a circuit between the wires 46—$46^a$ and 47—$47^a$. A circuit is also closed by pushing the button 22 through the wires 48—$48^a$ which energizes the coil 49 and moves the bar 50, and throws the switch arm $51^a$, closing the circuit between the wires 52—$52^a$ and 53—$53^a$. The foregoing electric connections have been made by throwing in the switch 20 and pressing the button 22, and the elevator has started downward.

When the elevator from the kitchen has reached the bottom of the shaft, the contact block 54 connects the terminals 55 and 56 and closes the circuit between the wires 53—$53^a$ and the wires 60—$60^a$ and 57—$57^a$, and the current from the battery 58 will energize the coil 59 and move the switch into the position shown at 51. At the same time a current from the battery 58 passes through the wires 53—$53^a$ to the wires 60—$60^a$ to the coil 61 and moves the bar 25 so that the arm will be in the position shown at $26^a$, and stops the motor 29. When the coil 24 is energized, the bar 25 throws the pivoted switch in contact with the wires $29^a$ and $29^b$, thereby transferring the current from the intake wires 27 and $27^a$ into the wires $29^a$ and $29^b$, thus reversing the motor 29. At the same time the current passes from the wires 60—$60^a$ through the wires 62—$62^a$, energizing the magnet 63 and moving the bar 44 drawing the switch out of contact as shown at 45 and moving the bar laterally so that its outer end enters the elevator as shown at 64. At the same time the contact block 65 allows the current from the battery 66 to flow through the switch $35^a$ and wires 37—$37^a$ to the wires 67—$67^a$, which energizes the coil 68 and throws the switch 35 into the position to connect the wires 47—$47^a$ with the battery 66.

The operator in the dining room having been notified from the kitchen that the food car is about to start, has in the same way closed the switch $20^a$ and pushed the button $22^a$ which correspond to the switch and button on the kitchen side, and has in this way closed the electric circuits on the dining room side of the system and caused the elevator B to descend, and the elevator having contact blocks corresponding to those on elevator A, has when it reaches the bottom of the shaft formed electric circuits corresponding to those formed by elevator A on the kitchen side of the system. The food car which has been lowered in elevator A, automatically leaves the elevator as soon as it reaches the bottom and is transported to elevator B. The way in which the food car is carried from one elevator to the other will be hereinafter described.

As the food car passes from the tracks and enters the elevator B, the bar 70 which has been moved into a position where its end extends into the elevator and which corresponds to the position of the bar 44 on the kitchen side of the system, is forced back into position, so that the switch $71^a$ closes an electric circuit from the battery 72, through the switch 73, wires 74—$74^a$, switch $71^a$, wires 169—$169^a$, switch 76 and wires 77—$77^a$, which energizes the coil 78, closing the circuit through the switch $79^a$ and wires 80—$80^a$ to the coil 81. When the coil 81 is thus energized, the bar 82 throws the pivotal switch 83 into contact with the wires $85^a$ and $85^b$ thereby reversing the current from the intake wires 84—$84^a$, thus reversing the motor 85 and raising the elevator B.

When the elevator B reaches the top, the current from the battery 86 passes through the switch 87 and wires 88—$88^a$, to the terminals 89—$89^a$, which contact with the block 90 on the elevator. It is apparent then that the current will flow through the wires 91—$91^a$ to the coil 92, which being energized will move the bar 82 to stop the motor. At the same time the current from the wires 88—$88^a$ will pass through the terminals 93—$93^a$ and the contact plate 94 on the elevator, and through the wires 95—$95^a$ to energize the coil 96, and break the circuit through the switch 79, thus leaving the entire electric circuit on the dining room side at rest until the operator again pushes the button $22^a$ to cause the elevator to again descend.

It is apparent that when the food car is returned from the dining room to the kitchen, or the elevator on the dining room side descends, the same connections will be made as above described when the elevator descended on the kitchen side, that is the coils 183 and $183^a$, 187—188, 160—161, 184—185 operate as do the corresponding coils on the kitchen side, and the wires 186—$186^a$, 190—$190^a$, 180—$180^a$, 169—$169^a$, 165—$165^a$ and 181—$181^a$, form the same electric circuits as do the corresponding wires on the kitchen side, and that on the kitchen side the terminals 2, 3, 4 and 5, together with the wires 6 and $6^a$, operate as do the corresponding terminals 89—$89^a$, 93—$93^a$ and the wires 95 and $95^a$ on the dining room side.

The elevator A after it has received the food car on its return from the dining room, will be in a similar manner automatically raised into the kitchen as was the elevator B raised on the dining room side, the electric connections for the latter having been above described.

The switch arm 35 above referred to is so constructed that one end will engage the wires 36—36ª, and the other end engage the wires 37—37ª, and conduct the current from the wire 36 to the wire 37, and from the wire 37ª to the wire 36ª. It is understood that all the switch arms are of like construction.

It is to be noted that when the elevator A reaches the bottom of the shaft, an electrical connection will be formed through the terminals 97 and the block 97ª on the elevator, so that the current will pass from the battery 98 through the wires 99—99ª and light the lamp 100 which is located in the dining room, and thus notify the operator there that the elevator from the kitchen side has reached the bottom. In a similar way when the elevator B reaches the bottom of the shaft, a circuit is formed through the terminals 101 and the contact block 101ª, so that the current from the battery 102 will flow through the wires 103 and 103ª and light the lamp 104 which is located in the kitchen, and will thus notify the operator there that the elevator from the dining room side has reached the bottom of the shaft. In a similar way when the elevators start to rise, the circuits on either side are broken, and the lamps 100 and 104 will go out thus indicating to the respective operators that the elevators have left the bottom. When the operator on the kitchen side presses the button 10, it rings the bell 12 in the dining room, this being a signal that the elevator is ready to leave. It is apparent that when the elevator has started to descend, the contact block 97ª will break the circuit through the terminals 105 and the light 14 will be extinguished, thus notifying the operator in the dining room that the elevator A has actually started on its downward course. A corresponding break in the circuit which illuminates the lamp 17 is made when the car B descends.

The elevators A and B heretofore referred to are similar in construction, and are both adapted to carry the food car as described. As shown in Fig. 5 the elevator A is comprised of a frame 106. This framework may be made of any desired material, but as shown in the drawings is of wood. It is open on the lower part in the front and rear. The framework is raised and lowered by means of the cable 31 which is secured to the top of the elevator in any desired way, such as by the staple 106ª. Secured to the top of the elevator are yokes 107, these yokes extending down into the interior of the elevator, and supporting at their lower ends bars 108. These bars 108 have their outer ends turned down as shown at 109 and carry T rails 110 which are secured in place by insulated bolts 111. The bars 108 also support a pair of channel irons 112 back to back, and which form a track as shown in Fig. 6 for the wheels of the food car which will be hereinafter referred to. Secured to the outside of the elevator are contact blocks 54, 65, 97ª and 113, the blocks 54 and 113 being insulated from each other as shown at 114 in Fig. 5. As shown in Fig. 5, the frame of the elevator is represented as made of wood. It is understood, however, that if made of metal, these contact blocks just referred to would be insulated from the frame of the elevator.

The elevator is adapted to carry the food car 114 which is made of any desired material, preferably of sheet metal, and has doors 115 and 115ª in the front and rear. A motor 116 is secured to the top of the food car, and this motor carries two sets of wheels 117 and 117ª which are adapted to run upon the lower flanges of the pair of channel irons 112 above referred to, and support the food car in the elevator. The front wheels of the set 117 are rotated by the motor through the gears 118—119—120, the shaft 121, and gears 122—122ª and gears 123—123ª. The set of wheels 117ª are pivotally secured to the motor by the pin 124 which passes through the arm 125 of the casing of the motor and is secured in place in the post 126, this post 126 being rigidly supported on the top of the casing of the food car. This allows the wheels of the set 117ª to oscillate, and facilitates the passage of the car around curves on the track after the car leaves the elevator. At either end of the top and near the side of the casing of the food car are posts 127 which support the spring bars 128. These bars 128 carry the contact shoes 129 which are insulated from the bars 128 as shown at 130, the shoe being held against the T rail 110 which carries the current for the motor. The electric current is led to the motor through the wire 131 which is connected to the shoe 129 by an insulated bolt 132. The wire 133 is also connected to the shoe 129 by an insulated bolt and leads to the resistance wires 134 which are supported in the interior of the food car for the purpose of keeping the food in the car hot during its passage from the kitchen to the dining room.

In Fig. 2 of the drawings is shown a plan view of the track and the electric conductor. The switch 135 is supposed to be located in the kitchen. When this switch is closed, the current from the intake wires passes through the wire 136 to the terminal 137, and when the elevator has reached the bottom of the shaft, the contact bar 138 carried on the frame of the elevator, will close the connection between the terminal 137 and the terminal 139, and the current will then pass through the wire 140 to the terminal 141 which is beveled and adapted to contact with the beveled end of the T rail 111. The other end of the T rail is also beveled and contacts with the beveled end of the conducting rail 142. This conducting rail as will be seen from Fig. 2, is made in sections, each section being insulated as shown at 143. It will be seen that the section 142 is connected to the wire 140 by the wire 144 which carries a current of lower power to the conducting rail 142 and will accelerate the motion of the car as it passes from the elevator onto the track outside. In the same way a section of the track 145 is connected by the wire 146, giving a still greater power and thus increasing the speed during the transit of the car. The section 147 is connected by the wire 148 which carries a less current and decreases the speed of the car as it approaches the elevator B. The difference in power given to the different sections of the track as above stated, is due to the difference in the resistance between the supply wire 140 and the different sections of the track.

It is apparent that unless the elevator B has been lowered to its place at the bottom of the shaft and is ready to receive the food car, the food car will not leave the elevator A, since the circuit will not be closed through the motor and the track 149 to the terminal 150, which is connected to the wire 151. The motor on the food car is provided with a reversing mechanism which is operated by the rod 152, so that when the food car enters the elevator B, the end of this rod 153 will strike the side of the elevator and be pushed back, reversing the motor for its return trip.

In case the operator in the kitchen desires to raise the elevator after the food car has left it, he pushes the button 22 which will energize the coil 43 and move the bar 44 into the same position that it would be in if the food car had entered the elevator and pushed the bar 44 in, thus making the electrical connections which have been described when the food car enters the elevator B, and immediately the elevator rises.

In case the operator in the kitchen, after the food car has been delivered in the dining room, has thrown open the switch 20 and thus prevented the elevator A with the food car on its return trip being automatically raised again into the kitchen, it is desirable that the operator in the kitchen should know when the food car has entered the elevator A and is ready to be raised again. We therefore provide a contact block 54 which is carried on the food car and is adapted to contact with the terminals 155 and 155ª in the elevator shaft when the car is in place in the elevator. When this block 54 comes in contact with these terminals 155—155ª, a current will pass from the battery 66 through the wires 156 and 156ª and through the wires 157 and 157ª, and light the lamp 158 in the kitchen, which will notify the operator there that the car is in place in the elevator ready to be raised.

While we have described this food conveying system as applicable to an elevator which descends into a basement, it is apparent that it is applicable to a system which would be used in connection with any number of floors or stopping places for the elevator and connecting track system, without departing from the principle of our invention. The food conveying system embodied in our invention provides for the rapid and easy conveyance of food from a kitchen to the dining room, in which system all the movements of the food car in transit are uninterrupted and automatic. It also provides for a clear understanding between the operator in the kitchen and the attendant in the dining room as to the location of the elevators and the food cars at all times during transit.

While we have indicated above that the device is for use in connection with transporting food, it is apparent that it can be used for the transporting of any material where it is desired that all the operations connected with the transit shall be automatic and continuous.

We claim:—

1. A conveying system comprising the combination of an elevator moving in an elevator shaft, electrically operated means for raising and lowering the elevator, a track and two contact rails supported within the elevator, a track and contact rails exterior of the elevator shaft and located at the bottom thereof and adapted to contact with the track and the contact rails in the elevator when the elevator is at the bottom of the shaft, a second elevator moving in an elevator shaft, and means carried on the second elevator to close an electric circuit from the first contact rail to the second contact rail when the second elevator is at the bottom of the shaft.

2. A conveying system comprising the combination of an electrically operated elevator moving in an elevator shaft, a track and contact rails supported within the elevator, a car carrying a motor suspended from and running on the track, electrical connection between the motor and the contact rails, a track and contact rails corresponding to those carried in the elevator but exterior of and spaced apart from the elevator shaft and adapted to contact with the track and the contact rails respectively in the elevator when the elevator is at the bottom of the shaft, one of said contact rails being sectionized, each of said sections being insulated from the other, electrical connections to each of the sections of said contact rail, electric means for delivering an electric current of different voltage to the several sections of said track, a second elevator moving in an elevator shaft, and means carried on the second elevator to close an electric circuit from the first contact rail through the motor on the car to the second contact rail when the second elevator is at the bottom of the shaft.

3. A conveying system comprising the combination of an electrically operated elevator moving in an elevator shaft, a track and contact rails supported within the elevator, a car carrying a motor suspended from and running on the track, electrical connection between the motor and the contact rails, a track and contact rails corresponding to those carried in the elevator but exterior of and spaced apart from the elevator shaft and adapted to contact with the track and the contact rails respectively in the elevator when the elevator is at the bottom of the shaft, one of said contact rails being sectionized, each of said sections being insulated from the other, electrical connections to each of the sections of said contact rail, electric means for delivering an electric current of different voltage to the several sections of said track, a second elevator moving in an elevator shaft, the second elevator having a track and contact rails similar to those on the first elevator and adapted to close the electric circuit from the sectionized rail through the motor and the car to the second contact rail for the current delivered to the sectionized rail.

4. A conveying system comprising the combination of an electrically operated elevator moving in an elevator shaft, a track and contact rails supported within the elevator, a car carrying a motor suspended from and running on the track, electrical connection between the motor and the contact rails, a track and contact rails corresponding to those carried in the elevator but exterior of and spaced apart from the elevator shaft and adapted to contact with the track and the contact rails respectively in the elevator when the elevator is at the bottom of the shaft, one of said contact rails being sectionized, each of said sections being insulated from the other, electrical connections to each of the sections of said contact rail, electric means for delivering an electric current of different voltage to the several sections of said track, a second elevator moving in an elevator shaft, the second elevator having a track and contact rails similar to those on the first elevator and adapted to close the electric circuit from the sectionized rail through the motor and the car to the second contact rail for the current delivered to the sectionized rail, and means operated by the car when it has reached the second elevator to raise the elevator and break the circuit between the contact rails.

5. A conveying system comprising two elevators moving in elevator shafts spaced apart from each other, electric means for raising and lowering the elevators, each of the elevators having a track and contact rails located on either side of the track, a track and contact rails similar to those carried in the elevators exterior of the elevator shafts and running from one elevator shaft to the other, the tracks and contact rails in the elevators being adapted to contact with the track and rails exterior of the elevator shafts when the elevators are at the bottom of the shaft, a car carried by one of the elevators and movable on the track therein, electric mechanism carried on the car to propel the car from said elevator along the track exterior of the elevator shafts to the other elevator, means for supplying an electric current from the contact rails to the car, means carried by the elevators to close the electric circuit from one contact rail through the car to the other contact rail only when both elevators are at the bottom of their respective shafts, means for closing an electric circuit operated by the car after it has left one elevator and entered the other, whereby the circuit through the contact rails is broken and the elevator raised, and means at the top of the elevator shaft for closing an electric circuit to raise and lower the elevator.

6. A conveying system comprising a plurality of electrically operated elevators, an independent car adapted to be transported in each elevator car, means for conveying the independent car from one elevator car to the other, and an electric controlling system governing the movement of the elevator cars and the conveying mechanism between the two elevator cars.

7. A conveying system comprising a plurality of electrically operated elevators having suitable cars, a track connection between the elevator wells, an independent car carried by the elevator cars and adapted to run over the said track connection from one elevator car to the other, and electrically operated means governing the operation of the elevators and of the independent car.

8. A conveying system comprising a plurality of elevators having elevator cars, a track connection between the elevator wells, an independent car carried by one of the elevator cars and adapted to run over the track connection to the second elevator car, and electrically operated controlling means governing the movements of the elevator cars and the independent car whereby the independent car can be shifted from one elevator car to the other.

9. A conveying system comprising a plurality of electrically operated elevators in separate wells, an independent conveying car carried alternately by the elevator cars, a track connection between the two elevators whereby the independent car can travel from one elevator car to the other, and a single electric control operated from a given point on one of the elevator wells and governing the movements of the elevator cars and the independent car.

10. A conveying system comprising two elevators moving in elevator shafts spaced apart from each other, electric means for raising and lowering the elevators, each of the elevators having a track and contact rails located on either side of the track, a track and contact rails similar to those carried in the elevator exterior of the elevator shafts and running from one elevator shaft to the other, the tracks and contact rails in the elevators being adapted to contact with the track and rails exterior of the elevator shafts when the elevators are at the bottom of the shaft, a car carried by one of the elevators and movable on the track therein, electric mechanism carried on the car to propel the car from said elevator along the track exterior of the elevator shafts to the other elevator, means for supplying an electric current from the contact rails to the car, means carried by the elevators to close the electric circuit from one contact rail through the car to the other contact rail when both elevators are at the bottom of their respective shafts, means for closing an electric circuit operated by the car after it has left one elevator and entered the other, whereby the circuit through the contact rails is broken and the elevator raised, means at the top of the elevator shaft for closing an electric circuit to raise and lower the elevator, means carried by the car to close an electric circuit and operate a signal at the top of the elevator shaft when the car has entered the elevator, and means carried by the car to reverse and stop the motor on the car when it has entered the elevator.

RAYMOND F. ALMIRALL.
ROBERT AUSTEN McCULLOCH.

Witnesses:
  U. A. DUFF,
  M. G. CULLEN.